United States Patent [19]
Schwab et al.

[11] Patent Number: 5,198,255
[45] Date of Patent: Mar. 30, 1993

[54] STABILITY IMPROVEMENTS OF OAT R-T-E CEREALS BY HIGH INTENSITY MICROWAVE HEATING

[75] Inventors: Edward C. Schwab, New Brighton; George E. Brown, Edina, both of Minn.

[73] Assignee: General Mills, Inc., Minneapolis, Minn.

[21] Appl. No.: 899,577

[22] Filed: Jun. 18, 1992

Related U.S. Application Data

[63] Continuation of Ser. No. 726,591, Jul. 8, 1991, abandoned.

[51] Int. Cl.$^5$ .................. A23L 1/00; A21D 15/00
[52] U.S. Cl. .................. 426/241; 426/242; 426/620; 426/621; 426/808
[58] Field of Search ............ 426/241, 242, 620, 621, 426/622, 808

[56] References Cited

U.S. PATENT DOCUMENTS

| | | | |
|---|---|---|---|
| 3,620,764 | 11/1971 | Watkins | 426/241 |
| 3,682,651 | 8/1972 | McAlister | 426/242 |
| 3,904,429 | 9/1975 | Eastman et al. | 426/242 |
| 3,908,029 | 9/1975 | Fredrickson | 426/242 |
| 4,251,551 | 2/1981 | Van Hulle et al. | 426/242 |
| 4,342,788 | 8/1982 | Clatfelter | 426/243 |
| 4,409,250 | 10/1983 | Van Hulle et al. | 426/242 |
| 4,413,018 | 11/1983 | Webster | 426/618 |
| 4,608,261 | 8/1986 | MacKenzie | 426/242 |
| 4,650,681 | 3/1987 | Greethead | 426/622 |
| 4,800,090 | 1/1989 | August | 426/243 |
| 4,803,090 | 2/1989 | Schlipalius et al. | 426/242 |
| 4,808,782 | 2/1989 | Nakagawa et al. | 426/241 |
| 4,950,492 | 8/1990 | Shachat et al. | 426/510 |
| 4,988,521 | 1/1991 | Fan | 426/621 |
| 5,102,679 | 4/1992 | Whalen | 426/242 |

FOREIGN PATENT DOCUMENTS

| | | |
|---|---|---|
| 0072878 | 3/1983 | European Pat. Off. |
| 0312363 | 4/1989 | European Pat. Off. |
| 0375006 | 6/1990 | European Pat. Off. |
| 2458-226 | 2/1981 | France |
| 2055285 | 3/1981 | United Kingdom |
| 2193619A | 2/1988 | United Kingdom |

OTHER PUBLICATIONS

"Snack, crackle pop!" Food Manufacture, Mar. 1990 pp. 37–38.

Primary Examiner—George Yeung
Attorney, Agent, or Firm—John A. O'Toole

[57] ABSTRACT

Disclosed are methods for treating a ready-to-eat cereal base fabricated from an oat containing cereal composition to increase the stability of the product. The methods comprise the step of subjecting the cereal base to a high intensity microwave field (>150 V/cm) for about 5 to 45 seconds. The treated cereal pieces exhibit superior stability and also improved flavor resulting from "interior" toasting of the cereal base.

66 Claims, No Drawings

STABILITY IMPROVEMENTS OF OAT R-T-E CEREALS BY HIGH INTENSITY MICROWAVE HEATING

This is a continuation of U.S. patent application Ser. No. 726,591, filed Jul. 8, 1991, now abandoned.

FIELD OF THE INVENTION

The present invention relates to food products and to methods for their preparation. More particularly, the present invention relates to ready-to-eat breakfast cereals and to their methods of preparation.

BACKGROUND

Ready-to-eat ("R-T-E") breakfast cereals are popular packaged food items. R-T-E cereals exist in large numbers of varieties including puffed and unpuffed, natural or presweetened, and including a wide variety of cereal compositions. While certain problems are general to all varieties of breakfast cereals, some problems are specific to particular categories of products. In particular, some problems result from the selection of individual ingredients for incorporation into the cereal composition.

Whole grain based R-T-E cereal compositions have long been popular, especially oats. In view of the growing awareness of the health benefits to people associated with consumption of soluble fiber and the contribution to soluble fiber consumption that oat and oat fiber-containing compositions can provide, there is a growing interest in R-T-E cereals formulated to comprise an oat component.

Unfortunately, however, a significant problem associated with an oat based ready-to-eat cereal, especially puffed cereals, is the stability characteristics associated with the oat component. Generally, these stability problems are due to the relative instability of oat materials. Furthermore, these problems are aggravated by oat-based R-T-E cereals having higher fat levels than other R-T-E cereals. As the finished oat-based cereal ages, the cereal develops a characteristic and undesirable off-flavor. This deterioration is observable both by organoleptic/hedonic testing as well as by analytical testing. Unfortunately, the off-flavor development is auto catalytic and thus once started rapidly increases. The upper concentration of protective antioxidants is limited by regulation. As a result, oat based R-T-E cereals have an additional potential mode of failure than other R-T-E cereal compositions which do not contain high fat contents. Other whole grain based R-T-E cereals having high native fat contents, e.g., corn and barley, can share this problem if formulated to include significant levels of their oil bearing germ fraction. While other whole grain R-T-E cereals also experience stability problems, these problems with oat based cereals are notoriously severe.

If aged product reaches consumers, many consumers will react negatively to the undesirable associated off-flavor development. In order to forestall negative consumer reaction, large quantities of finished R-T-E product must be discarded because of developing rancidity problems even with the best finished product inventory and distribution control system. Moreover, the production of cereal having stability problems is an especially acute problem associated with a commercial plant start-up. Indeed, a major reason for plant start-ups requiring extended start-up times is that plant operations are not considered stabilized until an R-T-E cereal is produced which does not develop premature flavor deterioration due to product instability.

Still another problem in cereal processing resides in flavor development. Many consumers prefer puffed cereals, and particularly oat containing puffed cereals. Moreover, consumers have become familiar with puffed oat based R-T-E cereal in complex shapes such as torroids or rings or other shapes such as stars. Such complexly shaped puffed cereals are generally prepared by gun puffing moist (e.g., 10% to 14% moisture) cereal pellets. While popular, many consumers enjoy the flavor of toasted cereals. Limited amounts of toasting can be imparted by the puffing gun but at a trade-off in lost throughput due to the increased residence times necessary to impart the toasted flavor. Unfortunately, it is difficult to evenly toast puffed R-T-E cereals after puffing (especially those cereal pieces having a complex shape) using conventional toasting equipment and methods. Generally, such known toasting techniques involve intense heating including radiant and/or conduction heating which involve heat transfer from the exterior of the piece inward. Due to the low density of puffed pieces which insulatively resists conductive heat transfer and due to complex shapes, undesirable scorching of the exterior surface can occur prior to the development of desirable toasted flavor by any significant weight of the interior of the cereal piece.

In view of the state of the art, there is a continuing need for improvements in the cereal processing art for preparing R-T-E cereals exhibiting increased stability.

Accordingly, it is an object of the present invention to provide improved cereal processing methods for the production of R-T-E cereals which exhibit increases in shelf stability.

It is another object of the present invention to provide improved cereal processing methods which can be used to prepare R-T-E cereals comprising an oat based cereal composition.

Accordingly, it is still another object of the present invention to provide a toasted, oat containing puffed R-T-E cereal which exhibits enhanced shelf stability.

Still another object of the present invention is to provide improved cereal processing methods which can be used to prepare R-T-E cereals which comprise oat components in addition to other farinaceous components.

Still another object of the present invention is to provide methods for cereal processing which can be readily practiced in present commercial cereal processing plants without requiring extensive modification of existing cereal processing processes or equipment.

Another object of the present invention is to provide cereal processing method improvements which can reduce the cost of cereal processing by reducing plant start-up time.

Another object of the present invention is to provide cereal processing methods which can provide improvements in product stability so as to allow the reduction or elimination of addition of stabilizers such as antioxidants to cereal compositions.

Surprisingly, the above objects can be realized and the present invention provides methods for dramatically increasing the stability of oat-based, especially puffed oat-based R-T-E cereals. The present invention involves subjecting the finished R-T-E cereal to a brief exposure to a high intensity microwave field. For sugar coated embodiments, the cereal base can be microwave heated prior to the application of the topical coating. In its product aspect, the present invention resides in finished products exhibiting enhanced shelf stability.

SUMMARY OF THE INVENTION

In its method aspect, the present invention resides in methods of treating finished oat containing R-T-E cereal products with high intensity microwave fields to provide products exhibiting improved stability and also improved flavor and texture resulting from "interior" toasting of the cereal base.

The present methods involve the step of treating a ready-to-eat cereal base fabricated from an oat containing cereal composition to increase the stability of the oat constituent. The methods comprise the step of subjecting the cereal base to a brief exposure to a high intensity (150 to 300 V/cm) microwave field sufficiently to impart anti-rancidity stability to the finished R-T-E cereal. Exposure times range generally for about 5 to 45 seconds.

In its product aspect, the present invention provides whole grain containing R-T-E cereals exhibiting greater flavor stability and improved flavor development, prepared by the present methods.

DETAILED DESCRIPTION OF THE INVENTION

The present invention provides improved oat containing R-T-E cereals and improved cereal processing methods for preparing such improved oat containing R-T-E cereals. The present methods involve subjecting an oat based R-T-E cereal to a brief exposure to a high intensity microwave field. The methods of the present invention are described in detail below.

Throughout the specification and claims, percentages are by weight and temperatures in degrees Fahrenheit unless otherwise indicated.

A. Providing An Oat Containing Cereal Base

The present methods involve treating an oat based or oat containing R-T-E cereal base. The cereal base comprises a plurality of individual pieces of finished R-T-E cereal compositions. The term "oat" cereal as used herein includes compositions which are oat based (i.e., containing over 50% of an oat component) or those cereal compositions merely comprising an oat component (i.e., containing about 1% to less than 50% of an oat component, preferably 10% to 50%). The term oat component is meant to include broadly all types of oat based materials including various oat varieties, sizes, fractions, however processed and especially those materials including a significant amount of the oat lipid constituent. Exemplary materials include oat flour, oat meal, oat bran, ground oat groats. The oat oil constituent level is high relative to other cereal grains and is more dispersed than in many popular grains. As a consequence, all oat fractions are "high" in fat content and are particularly susceptible to degradation due to fat constituent instability.

While the present invention is particularly directed towards oat containing cereals, the skilled artisan will appreciate that the present methods can also be used in connection with cereal compositions comprising grain flours including the oil bearing germ fractions or oil constituents, especially whole grain (with bran, germ and endosperm fractions) flours, including such materials derived from corn, wheat, barley, rice, rye and mixtures thereof.

The cereal base can comprise a wide variety of shapes, densities, and sizes. In particular, the cereal base can range in bulk density broadly from about 0.06 to 0.4 g/cc which bulk density includes both unpuffed and puffed cereal pieces. The term "puffed cereal pieces" is used herein in its conventional usage to refer to relatively larger, low density base pieces having a density ranging from about 0.06 to 0.14 g/cc, preferably about 0.09 to 0.12 (7 to 9 oz per 128 cubic inch). The term "unpuffed" cereal pieces is used herein to include flake cereals, shredded cereals (especially in the form of shaped biscuit pieces) and granolas. While unpuffed cereals can overlap in density with puffed cereals (especially when comparing unpuffed cereal bases with sugar coated or presweetened puffed cereals), unpuffed cereal bases generally range in density from about 0.09 to 0.4 g/cc. While useful in connection with both unpuffed and puffed R-T-E cereals, the present methods are especially useful for use in preparing puffed R-T-E cereals.

In the conventional preparation of an R-T-E cereal, a dry blend of cereal ingredients is well mixed and then combined with water and mixing with heat to cook or gelatinize the starchy component of the cereal composition. The gelatinized or cooked cereal upon further mixing forms a cooked farinaceous dough. A variety of well known cooking methods and equipment can be used to prepare a cooked cereal dough. For example, the wetted cereal blend can be processed in a cooker extruder or in a pressurized and agitated steam cooker each of which form a cooked cereal dough which in turn is fed to a cereal pellet forming extruder. In another embodiment, the cooking and dough forming steps are performed simultaneously in a high pressure, cooker extruder equipped with a pellet-forming die-head. The cooked cereal dough pellets so formed typically range from about 18% to 30% moisture. The pellets can then be dried and tempered to adjust the moisture content for further processing. In still another variation, puffed cereal pieces or base are directly expanded from the cooker extruder.

In the conventional preparation of a puffed, oat based R-T-E cereal, pellets, for example, having a moisture content of about 10% to 14% can be fed to a conventional puffing gun to form a puffed oat R-T-E cereal base. More particularly, for example, in the production of a puffed oat cereal, the whole oat groats are cooked and formed into a dough. The dough is then formed into shaped pellets, dried and tempered. The pellets having a moisture content of about 10% to 12% are then fed to a gun puffer and puffed to form puffed oat based cereal pieces. The puffed oat based cereal pieces exit the puffing gun at a moisture content of about 6%. In the production of regular, i.e., not presweetened by the application of a sugar coating, the puffed pieces are then dried to a final moisture content of about 3%. In one preferred embodiment, the puffed pieces are in the form of rings (or, equivalently herein "O's" or torroids). In the production of presweetened as well as flavored or bit coated, the puffed pieces are charged directly to an enrober at their exiting 6% moisture content and are then tumble coated with the topical coating materials such as sugar syrups with or without particulates, and dried to their final moisture content of about 3%. The particulates can include relatively smaller pieces of dried fruit bits, nuts, cereal flakes, and mixtures thereof. The coating step can be practiced to evenly coat the exterior of the cereal base or to be selectively deposited in recesses in known manner.

In another embodiment, the pellets having a moisture content ranging from about 10% to 21%, preferably 18% to 21%, can be shaped, such as by flaking, shredding or sheeting rolls to form shaped pieces which are then subjected to a heating step such as in a toaster or baking oven. If a flake type cereal product is desired, the pellets are flaked so as to produce flakes of desired thickness which generally is in the range of 0.015 to 0.020 inch. Generally, these thin flakes are then puffed to enhance their crispness and tenderness. A flake cereal is usually tenderized by rapid heating which converts the dense, hard flakes into more palatable, porous, tender flakes. A subsequent toasting operation is generally employed to enhance the color and flavor of the finished cereal product. Toasting is accomplished by heating the tenderized flakes, usually to 200° to 400° F. (93.3° to 204.4° C.). In the production of an R-T-E cereal, various general procedures are used depending upon the desired form, type or condition of the final product.

In another composition variation herein, namely in the preparation of shredded whole grains, cleaned grain is cooked at slightly below 212° F. under atmospheric pressure for about 30 to 40 minutes and a moisture content of 40% to 50%. Thereafter, the cooked cereal grain is cooled and tempered for up to 24 hours to equilibrate the moisture and allow the kernels to firm. The tempered cooked kernels can then be shredded with grooved rolls and formed into individual pieces or biscuits. While some shredded cereals are in the form of loose shreds, most shredded cereals are fabricated into larger individual pieces or biscuits. The individual biscuits are then baked in a band or continuous conveyor-belt oven. The oven is zoned and controlled so that the major heat input to the biscuits is in the first zone(s), where moisture removal occurs in the middle zone(s), and color development/toasting and final moisture removal occurs in the last zone(s).

In certain highly preferred embodiments of the present invention, the R-T-E pieces additionally include a flavor coating such as a presweetening coating. Well known compositions and presweetener coating application techniques can be employed both for sugar coating or when various high potency sweeteners, e.g., aspartame, acetylsulfame K. In more preferred embodiments, the presweetening coating comprises, optionally, sugar coating solution additionally comprising a flavor constituent and/or vitamins. The addition of a flavor constituent to the sugar coating solution is preferred due to flavor losses that can occur from the drying, toasting or puffing steps practiced herein. These steps, due to their heat application, tend to drive off the volatile flavor constituents leading to flavor degradation or loss. The certain other preferred embodiment coatings can also include particulates such as fruit and nut pieces and/or small cereal grain flakes.

In the preparation of granola cereals, the major raw material used to make a granola cereal is rolled oats, either regular whole-rolled (the old-fashioned type) or quick-cooking oats. Mixed with the oats are other ingredients, such as nut pieces, coconut, brown sugar, honey, malt extract, dried milk, dried fruits (raisins, dates, etc.), water, and vegetable oil. Spices such as cinnamon and nutmeg can also be added.

The water, oil, and other liquid flavorings are made into a suspension. The oats are blended with the other dry materials. The liquids and dry blend are mixed together in the proper amounts, and the wetted mass then spread in a uniform layer on the band of a continuous dryer or oven. Small volumes can also be produced by spreading the wetted mass in a uniform layer on baking pans for batch baking.

Baking takes place at temperatures in the range of 300° to 425° F. (149° to 218° C.) until the mat is uniformly toasted to a light brown and moisture reduced to about 3%. After toasting, the mat is broken up into chunky pieces. Of course, within this general outline of cereal processing, a wide variety of particular methods and variations can be used.

B. Exposing the Cereal Base to a High Intensity Microwave Field

The present methods essentially comprise the step of subjecting the oat cereal base or other grain based finished cereal to a high intensity microwave field. In the present invention, a high intensity microwave heating step is substituted (full or partial) for the conventional post-puffing drying step for puffed cereal products or to the toasting step for unpuffed cereal products.

In still another preferred embodiment, the puffed cereal base is prepared by direct expansion from a cooker extruder. Thereafter, the direct expanded cereal base having a moisture content of about 4% to 12% is exposed to high intensity microwave energy to stabilize and to provide interior toasting and flavor development. Such an embodiment is highly desirable due to the simplicity of product preparation method which eliminates multiple intervening steps (such as pellet formation, pellet tempering and drying, and pellet puffing) and the costs associated with such foregone steps.

In more preferred embodiments, the cereal base prior to microwave heating desirably has a moisture content adjusted to about 4% to 12%, preferably about 5% to 8%. As a result of the microwave heating step, the moisture content is reduced to about 1% to 6% to obtain a finished moisture content.

Commercial cereal production is generally continuous and the puffed cereal pieces, flakes or shreds, can be fed while still warm to the microwave unit for microwave toasting. In batch processing where the pieces are allowed to cool prior to microwaving, the microwave heating step is continued slightly longer within the below given duration ranges to allow for the lower inlet temperature of the cereal base pieces.

Surprisingly, the microwave heating treatment can give a mild toasting quality to the product but without burning. Importantly, the toasting is from the inside of the cereal piece outward rather than being outward to inward as would be obtained by toasting in a conventional toasting oven, i.e., a reversal of the toasting gradient from conventional processes. Such an interior toasting is important to providing a more enhanced toasted cereal taste without causing a burnt flavor to develop.

For those embodiments to be topically coated, the simplest and preferred variation is to microwave treat the cereal base prior to the application of the sugar coating. In a less preferred embodiment, the coated product can be microwave treated, preferably at a slightly higher moisture content than the desired finished moisture content.

Importantly, the present high intensity microwave exposure step is to be distinguished from heating of the cereal base pieces in a conventional microwave oven. A conventional home microwave oven is characterized by a relatively low and highly uneven field intensity. Microwave field intensity or, more precisely, energy dissipation density can be described, of course, in various ways. In the present invention, the microwave field intensity is described in a conventional manner as field strength expressed in units of volts per centimeter ("V/cm"). For comparison, this field strength is about 3 to 10 or more times greater than achieved in a conventional consumer microwave oven. Such high microwave field intensity can in turn involve high power dissipation (>100 w/g) in the product. In contrast, in a conventional microwave oven, as the unit's rated power increases, generally the unit's cavity size also increases so that the field strength remains relatively constant. This power density feature is important not only so that the operating/cooking performance remains relatively uniform regardless of cavity size but also to prevent premature burn-out of the magnetron by reverse channeling or microwave reflection through the wave guide.

In the present invention, the cereal base pieces are desirably subjected to a microwave density field of >150 V/cm, and for best results about 250 to 300 V/cm. The microwave field intensity of a conventional microwave oven typically is about 15 V/cm. Excessive field strength can, however, make control of the present, brief finishing step difficult to control. For preferred embodiments, the field strength desirably ranges from about 200 to 350 V/cm. Also, it is preferred to use higher microwave frequencies. Thus, between the two licensed microwave frequencies permitted at present, a 2450 MHz frequency is preferred to 915 MHz. Higher frequencies importantly give more uniformity at high field strength which in turn can result in greater uniformity in the finished product. Furthermore, such high field intensities at 915 MHz can lead to undesirable arcing. Measurement and/or calculation of field strength can be troublesome. Useful to measure such high intensity microwave field strength herein is a Microwave E-Field Probe or meter (Model No. MEF-1.5) available from Luxtron Corp. (Mountain View, Calif.).

Surprisingly, when finished cereal base pieces are subjected to lower intensity and/or uneven microwave fields such as are characteristic of consumer microwave ovens, the stability and flavor development benefits are not obtained. Cereal base pieces even when microwave heated in low quantities for extended times merely result in finished products undesirably exhibiting hardness and/or charring without the flavor and stability benefits provided herein. For reasons not understood, the pieces do not toast but quite suddenly transform from untoasted to burnt.

Microwave equipment that can provide the desired field strength is commercially available. Useful herein for practicing the present methods are industrially sized microwave ovens from Cober Electronics, Inc. and, preferably, from APV Baker, Inc. (For a good description, see GB 2,193,619A by R. J. Meredith and John Milton.) Minor modifications to the equipment may be required to adapt the equipment from a known application, e.g., rubber curing, to the sanitary standards that are conventional for food processing.

The exposure of the R-T-E cereal base to the high intensity microwave field is continued for sufficient time to impart to the base the desired oat stability benefits taught herein. Of course, the particular exposure times will vary depending upon such factors as the oat component selection and concentration, the microwave performance characteristics of the equipment selected including the microwave field characteristics it develops; the microwave absorbing characteristics of the cereal base, the quantity of pieces being processed at any time, etc. However, the treated cereal base can be readily tested for stability performance including accelerated temperature storage with conventional hedonic and/or hexanal analysis testing to establish the particular conditions desired. Generally, good results are obtained when oat flour based puffed cereal pieces starting at room temperature are exposed for times ranging from about 5 to 45 seconds within the above power densities. Better results in terms of toasting and stability improvements are obtained when exposure times range from about 10 to 45 seconds. For best results, exposure times desirably range from about 25 to 35 seconds. Generally, longer exposure times are selected when greater toasting and stability is desired or with lower power densities. Conversely, when only enhanced stability is desired with little toasting, shorter exposure times can be employed, and/or when the cereal pieces are treated immediately after puffing and while still warm or when employing higher power densities.

The operation of the gun puffing apparatus can be adjusted to provide some degree of toasting to the resulting puffed cereal pieces. Primarily, the adjustment involves retaining the pellets within the cereal gun for longer residence times so as to increase the pellets' exposure to the elevated temperature and pressure conditions within the gun. While effective to some degree, increasing the residence time of the pellets within the gun necessarily unfortunately decreases the throughput of pellets through the gun. Thus, the present methods involving a post gun puffing microwave step can employ reduced gun residence times. The advantages provided herein by reducing gun residence times importantly lead in turn to important gains in cereal throughput and production from the capital intensive gun puffing production.

In other embodiments of the present invention, unpuffed finished R-T-E cereal base pieces or finished cereals are treated in a manner comparable to the above description for puffed bases with only minor modification within the skill of the art. Of course, the degree of benefit to treating these other cereals will depend significantly, in part, upon the degree to which such cereals exhibit off-flavor stability problems associated with fat constituent deterioration.

In particular, unpuffed R-T-E cereal bases can include, but are not limited to, oat based or oat containing cooked cereal compositions in the form of flakes, shreds or baked shreds formed into biscuit pieces, and granola cereals. The present invention can also be used to treat shredded whole wheat biscuits.

The skilled artisan will appreciate that R-T-E cereal products can exhibit deficiencies in the stability of a wide variety of attributes or components. Foremost among these various stability problems are the off-flavor development associated with autocatalytic rancidification of the oat lipid constituent. The treated pieces obtained by the present methods exhibit surprising, beneficial and dramatically enhanced oat stability or product stability which in turn provides the product with dramatic improvements in shelf life and product quality.

Still another surprising advantage of the present invention is that the present methods allow for the even toasting of complexly shaped puffed R-T-E cereal pieces, i.e., all non-convex shaped puffed R-T-E cereal pieces. A "convex" shape is a mathematical definition of a two or three dimensional shape having the characteristic that a straight line drawn from any two interior points does not go outside the boundary of the shape. Examples of convex shapes include familiar geometric shapes such as spheres, cones, ellipsoids, etc. When complex, i.e., "non-convex" shapes such as rings, stars or figurines (e.g., animals, plants, ships, planes, people) or letters are toasted by known toasting methods involving radiant or conductive heat, the recessed portions of the cereal pieces resist toasting development resulting in low homogeneity.

After microwave toasting, the microwave treated pieces are allowed to cool to ambient temperature and then subsequently processed (e.g., sugar coated) and/or packaged and distributed in conventional manner.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the R-T-E cereal art, can be undertaken without departing from the spirit and scope of the invention.

EXAMPLE 1

To test and compare the stability benefits imparted by high intensity microwave heating to an oat based puffed R-T-E cereal, a sample of a product of the present invention was prepared. An unsweetened, puffed oat based R-T-E cereal composition in the shape of rings (marketed under the brand name Cheerios ®) was microwaved at a feed rate of 2 lbs/min in a high intensity microwave unit (available from APV Baker at a rated power capacity of 13.5 kW). The unit has an adjustable power feature and 12 kW of microwave power was used and the residence time in the microwave chamber was 41 seconds. The moisture of the base feed was 6.2%. After microwaving, the product had a moisture content of 3%. The field intensity during the microwave toasting wa about 160 V/cm.

Three samples were placed in accelerated, high temperature storage: Sample 2 was a fresh quantity of cereal base dried conventionally to 3.5% moisture. Sample 1 was the product prepared as described. A third sample, Sample 3, comprised the microwaved product with its moisture adjusted to match the plant product.

After 10 weeks storage at 100° F. the samples were analyzed for hexanal and assigned a value on an assigned scale directly correlated to measured hexanal values and based on the analytical results. In the assigned scale, a hexanal value greater than 1 (2.7 ppm hexanal) is considered rancid. Sample 2 was rancid to the taste and had a hexanal value of 1.2. Samples 1 and 3 were still acceptable to the taste and had hexanal values of 0.4 and 0.7 respectively. The samples were again analyzed after 18 weeks of storage. Even after 18 weeks at 100° F., Samples 1 and 3 did not have a rancid flavor and their hexanal values were 1.2 and 1.0 respectively. Sample 2 at 18 weeks tasted very rancid and had a hexanal value of 2.9.

The results of this testing demonstrate the relative shelf life stability superiority of products of the present invention comprising oat based puffed R-T-E cereal pieces that have been exposed to high intensity microwave heating. When tested within a few days after microwave treatment, the treated cereal pieces exhibited a toasted flavor although the toasted flavor diminished with prolonged storage but is always superior in flavor to an untreated sample.

EXAMPLE 2

A sample quantity of an oat based puffed O's cereal pieces which were known to be of questionable quality were obtained. A portion of the sample quantity was microwaved in a high intensity microwave oven (available from APV Baker having a rated capacity of 3.5 kW). The conditions of power and feedrate were selected to impart a condition of microwave field intensity of about 300 V/cm to the cereal pieces. These conditions included a feedrate of 0.65 lb/min, 13.5 kW microwave power, and a residence time of 21 seconds. The microwaved sample quantity product and the untreated sample quantity product were each separately dried in a conventional hot air belt dryer to about 4% moisture and stored at 100° F. After four weeks, the microwave treated sample had a hexanal value of 0.3, the untreated sample 0.5. Expert tasters rated the treated sample significantly better. After six weeks, the untreated sample had a hexanal value of 1.05 and was definitely rancid. The treated sample had a value of 0.4 and was rated as having an acceptable taste.

The results of this testing further demonstrates the relative shelf life stability superiority of products of the present invention comprising oat based puffed R-T-E cereal pieces that have been exposed to high intensity microwave heating.

What is claimed is:

1. A method for improving the shelf life of a cereal oil containing R-T-E cereal, comprising the steps of:
    subjecting a finished R-T-E cereal or cereal base containing a cereal oil to a high intensity microwave field for a sufficient time to increase the fat stability of the cereal oil,
    wherein the microwave field has a field strength of at least 150 V/cm.
2. The method of claim 1
    wherein the cereal or cereal base has a moisture content ranging from about 3% to 12% by weight,
    wherein the microwave step is continued for about 5 to 45 seconds.
3. The method of claim 2
    wherein the microwave field intensity ranges from about 150 to 350 V/cm.
4. The method of claim 3
    wherein the cereal or cereal base comprises a cereal germ component.
5. The method of claim 4
    wherein the cereal base comprises cereal flakes, granola, shreds, shredded biscuits, puffed pieces, and mixtures thereof.
6. The method of claim 5
    wherein the cereal base comprises puffed cereal pieces.
7. The method of claim 6
    wherein the puffed cereal pieces comprise "O" shaped pieces.
8. The method of claim 1 additionally comprising applying a topical coating to the cereal base.
9. The method of claim 8
    wherein the topical coating step follows the microwave step.
10. The method of claim 9
    wherein the topical coating comprises particles relatively smaller than the cereal base including fruit pieces, nuts, cereal flakes and mixtures thereof.

11. The method of claim 10
wherein the coating additionally comprises a sweetener.

12. The method of claim 1
wherein the particulate pieces are evenly dispersed over the surface of the cereal base.

13. The method of claim 12
wherein the particulate pieces are concentrated in the recesses or cavities of the cereal base.

14. The method of claim 13
wherein the cereal base comprises puffed ring shaped cereal pieces.

15. The method of claim 14
wherein the cereal base comprises whole wheat.

16. The method of claim 15
wherein the cereal base comprises whole corn.

17. The product prepared by the method of claim 1.
18. The product prepared by the method of claim 5.
19. The product prepared by the method of claim 6.
20. The product prepared by the method of claim 9.

21. The method of claim 1
wherein the cereal base comprises an oat based or oat containing cooked dough,
wherein the cereal base has a moisture content ranging from about 3% to 12% by weight, and
wherein the microwave step is continued for about 5 to 45 seconds.

22. The method of claim 21
wherein the field intensity ranges from about 150 to 250 V/cm.

23. The method of claim 22
wherein the cereal base comprises an oat based cereal base.

24. The method of claim 23
wherein the cereal base comprises cereal flakes, granola, shreds, shredded biscuits, puffed pieces, and mixtures thereof.

25. The method of claim 24
wherein the cereal base comprises puffed cereal pieces.

26. The method of claim 25
wherein the puffed cereal pieces comprise "O" shaped pieces.

27. The method of claim 26 additionally comprising applying a topical coating to the cereal base.

28. The method of claim 27
wherein the topical coating step follows the microwave step.

29. The method of claim 28
wherein the topical coating comprises particles relatively smaller than the cereal base including fruit pieces, nuts, cereal flakes and mixtures thereof.

30. The method of claim 29
wherein the coating additionally comprises a sweetener.

31. The method of claim 30
wherein the particulate pieces are evenly dispersed over the surface of the cereal base.

32. The method of claim 31
wherein the particulate pieces are concentrated in the recess or cavities of the cereal base.

33. The method of claim 32
wherein the cereal base comprises puffed ring shaped cereal pieces.

34. The method of claim 25
wherein the cereal base is in the form of a star.

35. The method of claim 23
wherein the cereal base comprises cereal flakes.

36. The method of claim 23
wherein the cereal base comprises granola.

37. The method of claim 23
wherein the cereal base comprises shredded biscuits.

38. The method of claim 23
wherein the cereal base comprises shreds.

39. The product prepared by the method of claim 21.
40. The product prepared by the method of claim 24.
41. The product prepared by the method of claim 26.
42. The product prepared by the method of claim 31.
43. The product prepared by the method of claim 36.

44. The method of claim 25 additionally comprising the steps of
forming a puffed cereal base by cooking an oat based cereal composition in an extruder to form a cooked oat based cereal composition, extruding the cooked oat based cereal composition through a shape-forming extruder die under conditions to puff the cooked cereal composition to form shaped and sized puffed cooked oat based cereal pieces; and
directly thereafter, subjecting the cereal pieces to a high intensity microwave field of about 150 to 350 V/cm for about 5 to 45 seconds to form stabilized, puffed oat based R-T-E cereal pieces.

45. The method of claim 44
wherein the cereal piece has a non-convex shape.

46. The method of claim 45
wherein the cereal piece comprises puffed ring shaped cereal pieces.

47. The method of claim 26 additionally comprising applying a topical coating to the cereal base.

48. The method of claim 27
wherein the topical coating step follows the microwave step.

49. The method of claim 28
wherein the topical coating comprises particles relatively smaller than the cereal base including fruit pieces, nuts, cereal flakes and mixtures thereof.

50. The method of claim 29
wherein the coating additionally comprises a sweetener.

51. The method of claim 30
wherein the particulate pieces are evenly dispersed over the surface of the cereal base.

52. The method of claim 31
wherein the particulate pieces are concentrated in the recess or cavities of the cereal base.

53. The product prepared by the method of claim 21.
54. The product prepared by the method of claim 24.
55. The product prepared by the method of claim 26.
56. The product prepared by the method of claim 31.
57. The product prepared by the method of claim 36.

58. An R-T-E cereal exhibiting improved flavor and improved stability, comprising:
an R-T-E cereal base comprising a cooked cereal dough including a cereal oil component, said cereal base having an interior toasting gradient.

59. The R-T-E cereal of claim 58
wherein the interior toasting gradient is a high intensity microwave interior toasting gradient.

60. The R-T-E cereal of claim 59
wherein the R-T-E cereal base is an oat based cooked cereal dough.

61. The R-T-E cereal of claim 60
wherein the R-T-E cereal base is in the form of puffed pieces, flakes, shreds, shredded biscuits, granolas and mixtures thereof.

62. The R-T-E cereal of claim 61 wherein the R-T-E cereal base is in the form of puffed pieces.

63. The R-T-E cereal of claim 62 wherein the puffed pieces have a non-convex shape.

64. The R-T-E cereal of claim 63 wherein the puffed pieces are in the shape of rings, stars, letters, figurines and mixtures thereof.

65. The R-T-E cereal of claim 64 wherein the puffed pieces are in the shape of rings.

66. The R-T-E cereal of claim 65 wherein the puffed pieces further include a topical sweetener coating.

* * * * *